US012627880B2

(12) United States Patent
Gao et al.

(10) Patent No.: US 12,627,880 B2
(45) Date of Patent: May 12, 2026

(54) TARGETED IMAGE ADJUSTMENT

(71) Applicant: Snap Inc., Santa Monica, CA (US)

(72) Inventors: Qiang Gao, San Diego, CA (US); Tuo Wang, Irvine, CA (US); Anbang Zhao, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 85 days.

(21) Appl. No.: 18/470,732

(22) Filed: Sep. 20, 2023

(65) Prior Publication Data

US 2024/0236478 A1     Jul. 11, 2024

Related U.S. Application Data

(60) Provisional application No. 63/479,200, filed on Jan. 10, 2023.

(51) Int. Cl.
*H04N 23/63* (2023.01)
*G06F 3/04845* (2022.01)
(Continued)

(52) U.S. Cl.
CPC ....... *H04N 23/632* (2023.01); *G06F 3/04845* (2013.01); *G06F 3/04847* (2013.01); *G06T 7/0002* (2013.01); *H04N 23/617* (2023.01); *H04N 23/64* (2023.01); *G06T 2200/24* (2013.01); *G06T 2207/20081* (2013.01); *G06T 2207/20084* (2013.01); *G06T 2207/30168* (2013.01); *H04N 23/611* (2023.01)

(58) Field of Classification Search
CPC ...... H04N 1/628; H04N 23/61; H04N 23/611; H04N 23/617; H04N 23/631; H04N 23/632; H04N 23/64
See application file for complete search history.

(56) References Cited

U.S. PATENT DOCUMENTS

2018/0033149 A1*  2/2018  Jeong ................... G06V 40/103
2020/0344411 A1*  10/2020  Cragg ................... H04N 23/64
(Continued)

OTHER PUBLICATIONS

"International Application Serial No. PCT/US2024/011048, International Search Report mailed Apr. 22, 2024", 3 pgs.
(Continued)

*Primary Examiner* — Daniel M Pasiewicz
(74) *Attorney, Agent, or Firm* — Schwegman Lundberg & Woessner, P.A.

(57)          ABSTRACT
System and method to perform targeted image adjustments starts with a processor receiving a media content item and identifies an image adjustment parameter and an adjustment value based on the media content item. Processor generates an adjusted media content item using the image adjustment parameter and the adjustment value and causes an adjustment interface to be displayed by a display of a user device. The adjustment interface can comprise the adjusted media content item and a selectable item associated with the image adjustment parameter. The selectable item can include settings. In response to receiving a selection of one of the settings of the selectable item, processor generates a final media content item based on the selection of the one of the settings, and cause the final media content item to be displayed by the display of the user device. Other embodiments are described herein.

20 Claims, 9 Drawing Sheets

(51) Int. Cl.
| | |
|---|---|
| *G06F 3/04847* | (2022.01) |
| *G06T 7/00* | (2017.01) |
| *H04N 23/60* | (2023.01) |
| *H04N 23/611* | (2023.01) |
| *H04N 23/617* | (2023.01) |

(56) References Cited

U.S. PATENT DOCUMENTS

| | | | |
|---|---|---|---|
| 2021/0297582 A1* | 9/2021 | Brown ................. | G06N 3/0464 |
| 2022/0321769 A1 | 10/2022 | Saint-Preux | |

OTHER PUBLICATIONS

"International Application Serial No. PCT/US2024/011048, Written Opinion mailed Apr. 22, 2024", 6 pgs.
"International Application Serial No. PCT/US2024/011048, International Preliminary Report on Patentability mailed Jul. 24, 2025", 8 pgs.

\* cited by examiner

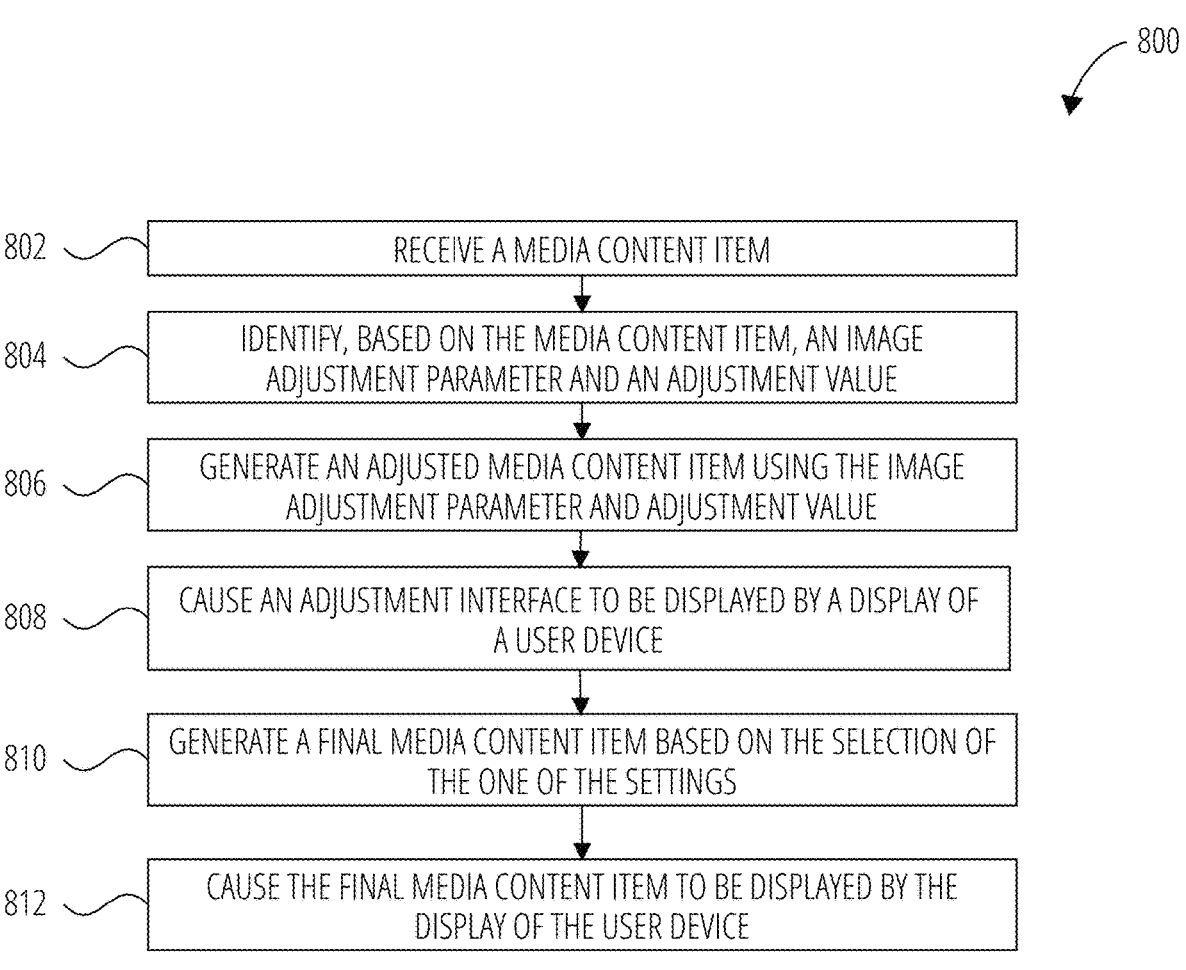

```
                                                          800

802 ──┐   RECEIVE A MEDIA CONTENT ITEM

804 ──┐   IDENTIFY, BASED ON THE MEDIA CONTENT ITEM, AN IMAGE
          ADJUSTMENT PARAMETER AND AN ADJUSTMENT VALUE

806 ──┐   GENERATE AN ADJUSTED MEDIA CONTENT ITEM USING THE IMAGE
          ADJUSTMENT PARAMETER AND ADJUSTMENT VALUE

808 ──┐   CAUSE AN ADJUSTMENT INTERFACE TO BE DISPLAYED BY A DISPLAY OF
          A USER DEVICE

810 ──┐   GENERATE A FINAL MEDIA CONTENT ITEM BASED ON THE SELECTION OF
          THE ONE OF THE SETTINGS

812 ──┐   CAUSE THE FINAL MEDIA CONTENT ITEM TO BE DISPLAYED BY THE
          DISPLAY OF THE USER DEVICE
```

FIG. 8

TARGETED IMAGE ADJUSTMENT

CROSS-REFERENCE TO RELATED APPLICATION

This patent application claims the benefit of U.S. Provisional Patent Application No. 63/479,200, filed Jan. 10, 2023, entitled "TARGETED IMAGE ADJUSTMENT", which is incorporated by reference herein in its entirety.

BACKGROUND

Electronic messaging, particularly instant messaging, continues to grow globally in popularity. Users are quickly able to share with one another electronic media content items including text, audio, images, pictures and videos instantly.

Current client or user devices, such as smartphones, are equipped with cameras for the user to quickly capture pictures and videos to be shared. However, these cameras still fail to work equitably for everyone in every situation or lighting conditions.

The deficiencies of cameras stem from the camera design at its inception. The "Shirley Cards", introduced in the 1940s, are the color reference cards used to perform skin-color balance in still photography printing. Cameras were designed specifically to capture the skin tone of the White woman that is featured on the "Shirley Cards." Since the camera was not invented with people of all skin tones in mind, the design process failed to recognize the need for an extended dynamic range.

Current cameras are still not appropriately designed to account for and optimize pictures and videos for all skin tones. When capturing pictures low light, current cameras search for light or a lightened part within the viewfinder before the shutter is released. If there is no lightened part, the camera will be focusing on a dark part within the viewfinder and is rendered inactive. In other words, the camera only knows how to calibrate itself against lightness to define an image. Similarly, innovative technology such as facial tracking is unable to recognize darker skin tones in some lighting conditions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 8 illustrates a process of performing targeted image adjustments in accordance with one embodiment.

DETAILED DESCRIPTION

Figure 1:
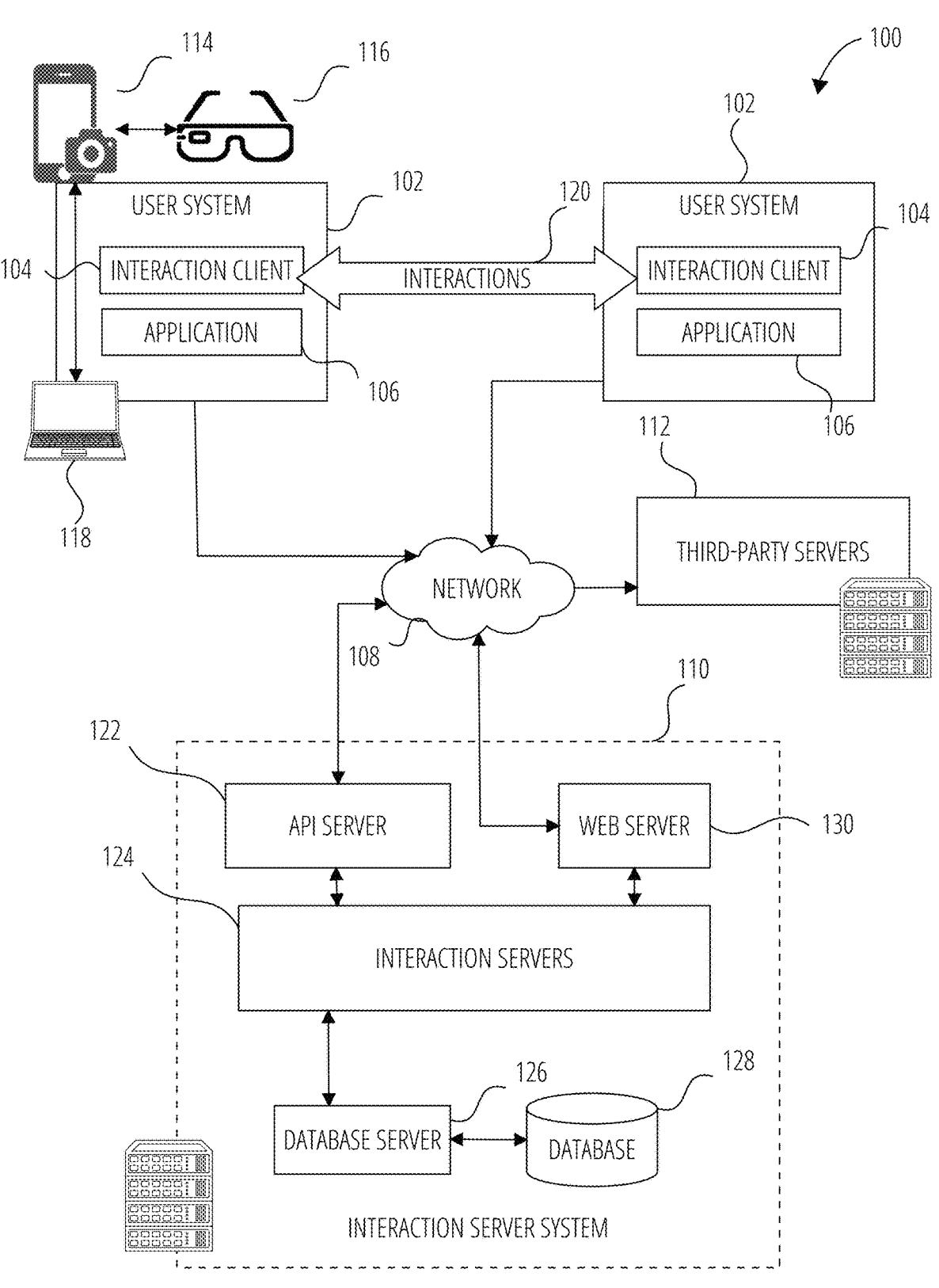
FIG. 1 is a diagrammatic representation of a networked environment in which the present disclosure may be deployed, according to some examples.

Embodiments of the present disclosure improve the functionality of camera systems as well as electronic messaging software and systems by generating targeted adjustments to media content items including images (e.g., photos and videos) captured using the cameras that account for different skin tones in every situation or lighting conditions. This ensures that the cameras and the messaging system can equitably produce high quality images for every user and thus, improving the camera experience for all users.

Specifically, embodiments of the present disclosure describe a targeted image adjustment system that implements an algorithm that automatically identifies at least one image adjustment parameter and at least one adjustment value to be applied to a media content item in order to generate an adjusted media content item. The image adjustment parameters can include, for example, brightness, tone, temperature, contrast, gamma, sharpness, etc. The media content item can be a pre-capture image or video that is being displayed in the viewfinder of the user system and being pre-processed by the target image adjustment system or can be an image or video that is captured using the camera of the user system and being post-processed by the targeted image adjustment system. The pre-capture image or video is an image or video that is not yet captured and stored by the camera, but is being displayed in the viewfinder as a preview for the user of the camera.

The targeted image adjustment system can thus automatically improve the media content item by applying the changes to the adjustment parameter that is most likely to be desired by the user. For example, if the media content item is a photo including a human face that is not visible based on the lighting in the photo, the targeted image adjustment system can automatically determine that the shadows are to be removed by decreasing the contrast or by increasing the brightness of the image. The algorithm can be programmed based on test image adjustment parameters, test adjustment values, and test media content items. The test image adjustment parameters and test adjustment values can be provided by professional photographers such that the parameters and values represent the desired changes needed to be made to the test media content items, for example. The targeted image adjustment system can also include a neural network or machine-learning system that is trained using the test image adjustment parameters, the test adjustment values, and the test media content items.

The targeted image adjustment system may identify one image adjustment parameter that is most needed to be applied to the media content item (e.g., tone). In one example, the targeted image adjustment system causes an adjustment interface to be displayed on a user device that includes the adjusted media content item having had the automatic targeted image adjustments applied thereto. The adjustment interface also includes a selectable item that is associated with the image adjustment parameter (e.g., tone) that allows the user of the user device to further change the adjustment value of the image adjustment parameter to fine tune the adjusted media content item. For example, while the targeted image adjustment system already automatically increased or decreased the tone of the media content item to generate the adjusted media content item, the user can further increase or decrease the tone of the adjusted media content item using the selectable item.

The targeted image adjustment system can also identify the image adjustment parameter and the adjustment value based on camera personalization settings (e.g., for the camera or the user system) associated with a skin tone or a skin undertone of a user of the user system. A pre-capture setting and a post-processing setting can be determined using the camera personalization settings. The pre-capture setting can be stored on the user system such that it is personalized to the user of the user system and the camera of the client can be calibrated using the pre-capture setting. Additionally, when the camera is used to capture an image, the targeted image adjustment system can receive a media content item that includes the image and modify the media content item using the post-processing setting to generate an adjusted media content item.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
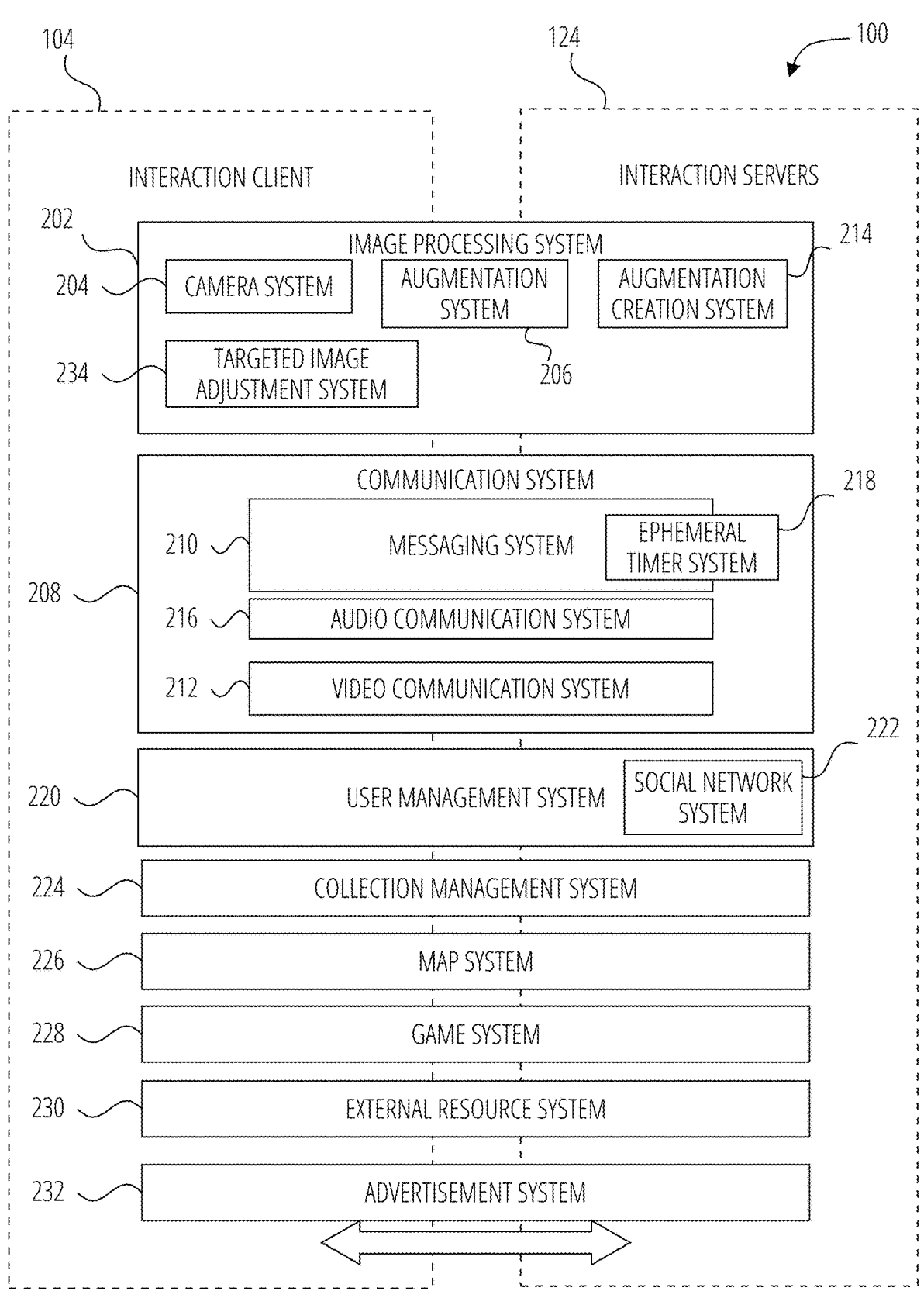
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The targeted image adjustment system 234 controls the settings associated with cameras included in the user system 102 for use with the interaction system 100. The settings can include pre-capture settings and post-processing settings. The targeted image adjustment system 234 can cause the cameras included in the user system 102 to be calibrated in accordance with the pre-capture settings. The targeted image adjustment system 234 can store the pre-capture settings in the memory of the user system 102. The targeted image adjustment system 234 can be configured to function with the image processing system 202 to perform various image processing operations on media content items (e.g., images or videos) including performing post-processing in accordance with the post-processing settings. The targeted image adjustment system 234 can identify an image adjustment parameter and an adjustment value associated with the image adjustment parameter (e.g., 10% increase in temperature) needed to be applied to a media content item. The image adjustment parameters can include, for example, brightness, tone, temperature, contrast, gamma, sharpness, etc. The targeted image adjustment system 234 can apply targeted adjustments to generate an adjusted media content item using the image adjustment parameter and the adjustment value identified. In one example, the targeted image adjustment system 234 can also cause an adjustment interface to be displayed that includes the adjusted media content item and a selectable item such as a slider or a dial that includes a plurality of settings that is associated with the image adjustment parameter to allow the user to further modify the adjusted media content item by changing the level or adjustment value of the image adjustment parameter being applied. Based on the fine-tuned adjustment made by the user via the selectable item, the targeted image adjustment system 234 can further adjust how it identifies the image adjustment parameters or the adjustment value it identifies and automatically applies the targeted adjustments to media content items going forward.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
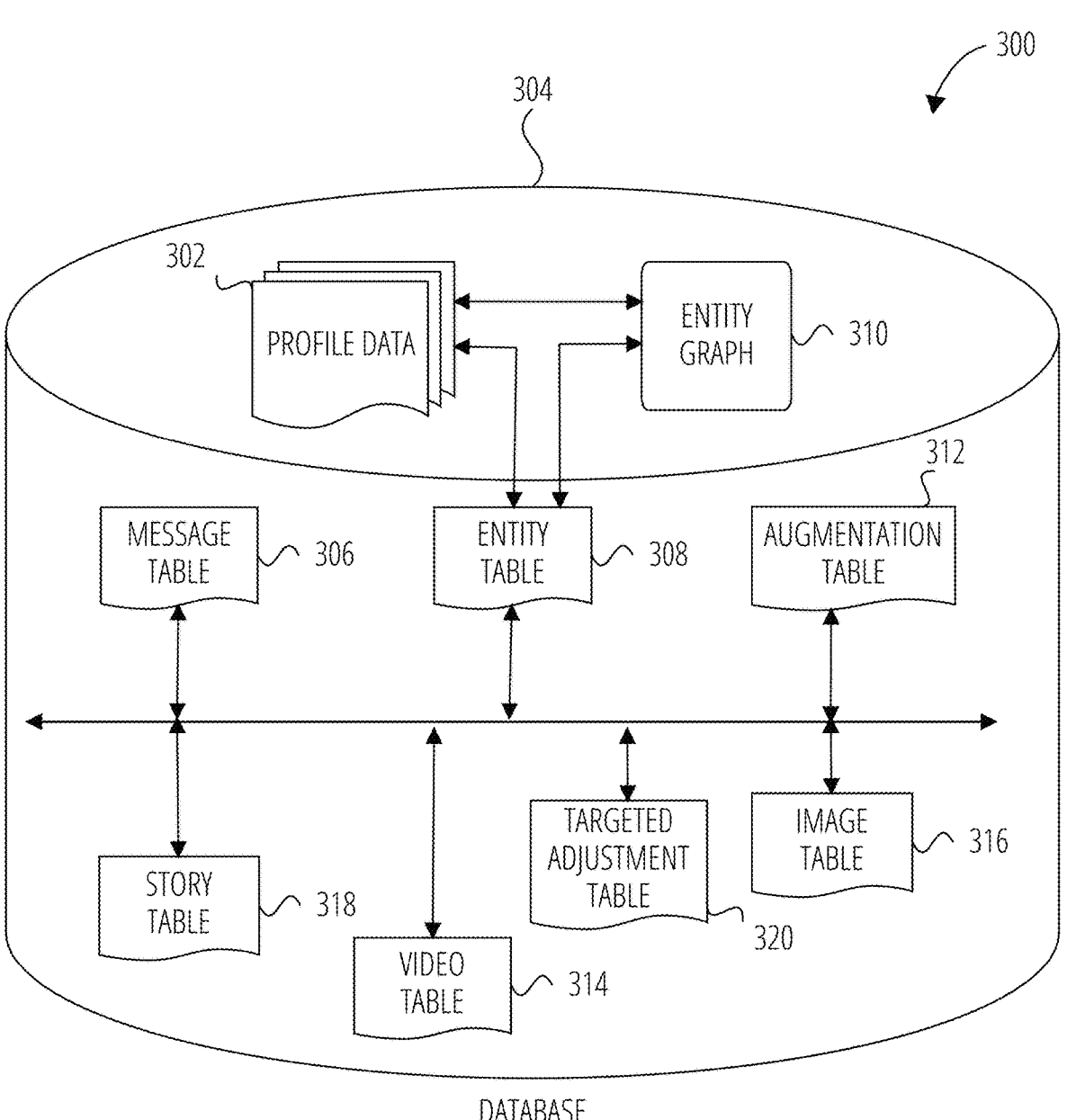
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices or user devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include a targeted adjustment table 320 that stores data used to train the targeted image adjustment system 234. For example, the targeted image adjustment system 234 can comprise a neural network, a machine-learning system, or an algorithm. The neural network, the machine-learning system, or the algorithm can be trained using the test image adjustment parameters, a plurality of test adjustment values, and a plurality of test media content items in order to identify based on the media content item received, an image adjustment parameter and an adjustment value. The targeted adjustment table 320 can store the test image adjustment parameters, the test adjustment values, the test media content items, as well as the media content item received, the image adjustment parameter and the adjustment value that are generated. The targeted adjustment table 320 can also store a user's selection of settings of the image adjustment parameters used to further fine tune the adjusted media content item.

Additionally, metadata associated with media content items such as images or videos that are publicly shared on the interaction server system 110 can be stored in the targeted adjustment table 320. The metadata can indicate the pre-capture settings of the camera capturing the media content item, the type of camera used to capture the media content item, and the post-processing settings applied in the media content item, the setting selection (e.g., skin tone, skin undertone, etc.) associated with the camera, the background color, the lighting condition, etc.

Data Communications Architecture

Figure 4:
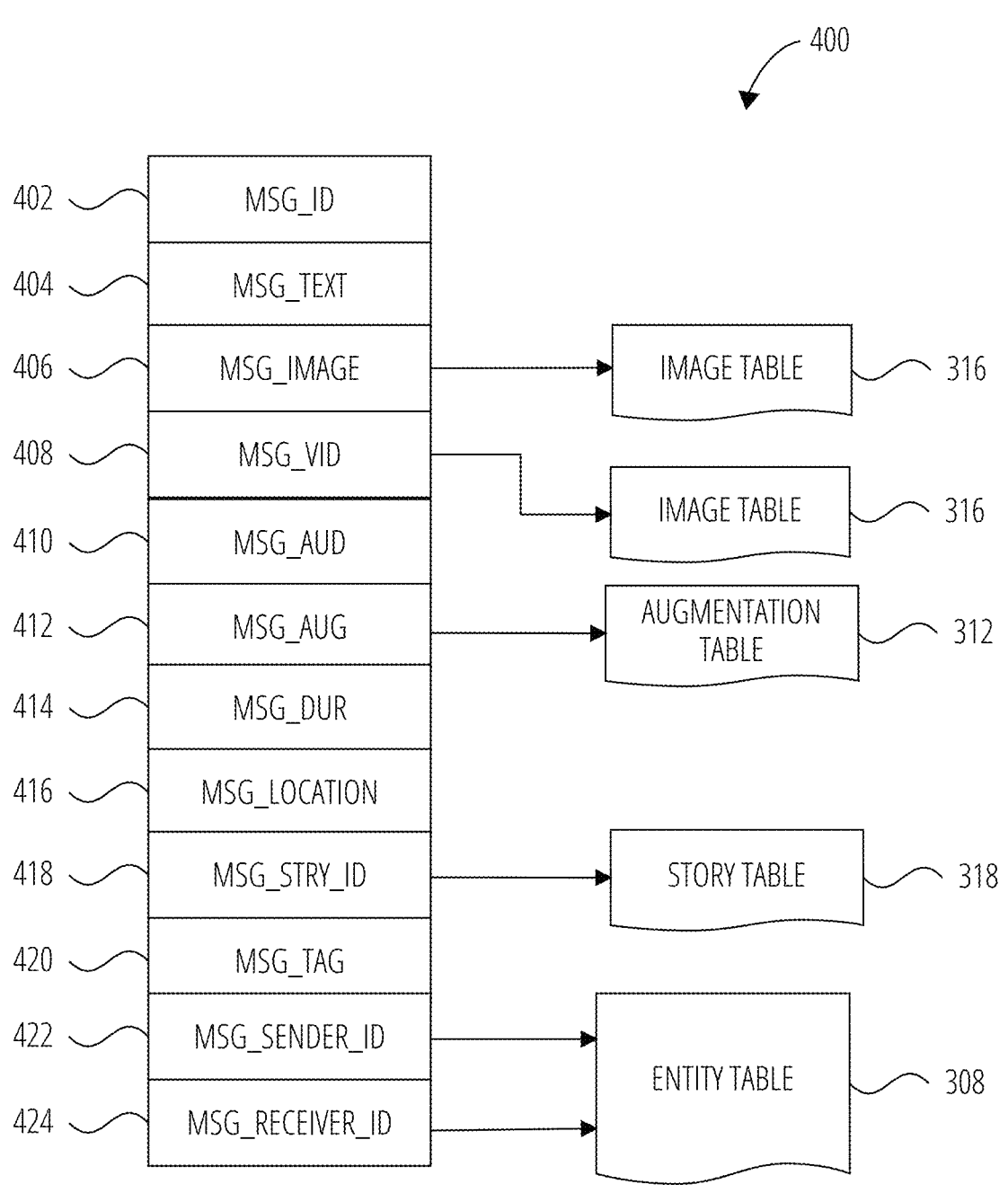
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

System with Head-Wearable Apparatus

Figure 5:
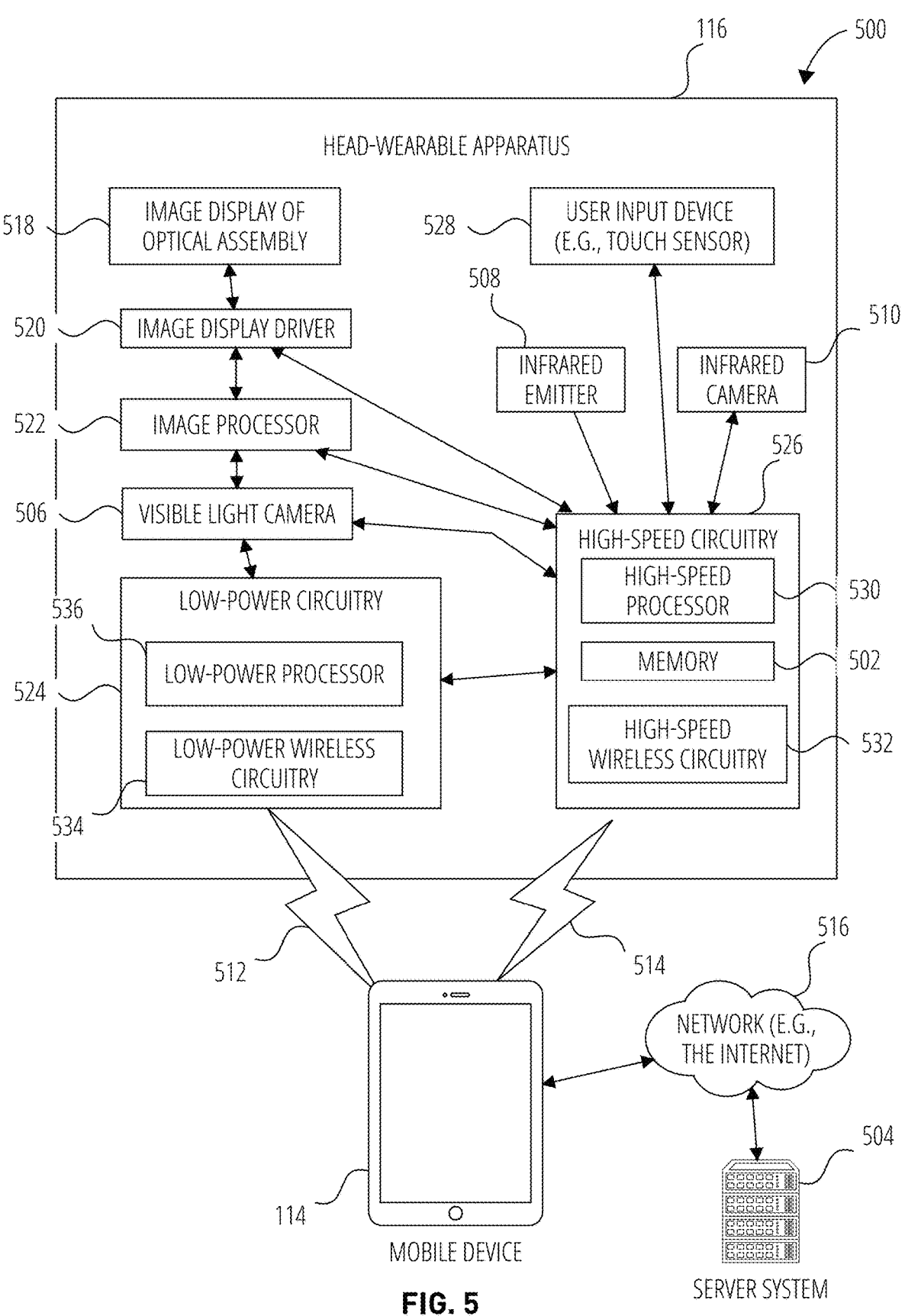
FIG. 5 illustrates a system in which the head-wearable apparatus, according to some examples.

FIG. 5 illustrates a system 500 including a head-wearable apparatus 116, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532.

Machine Architecture

Figure 6:
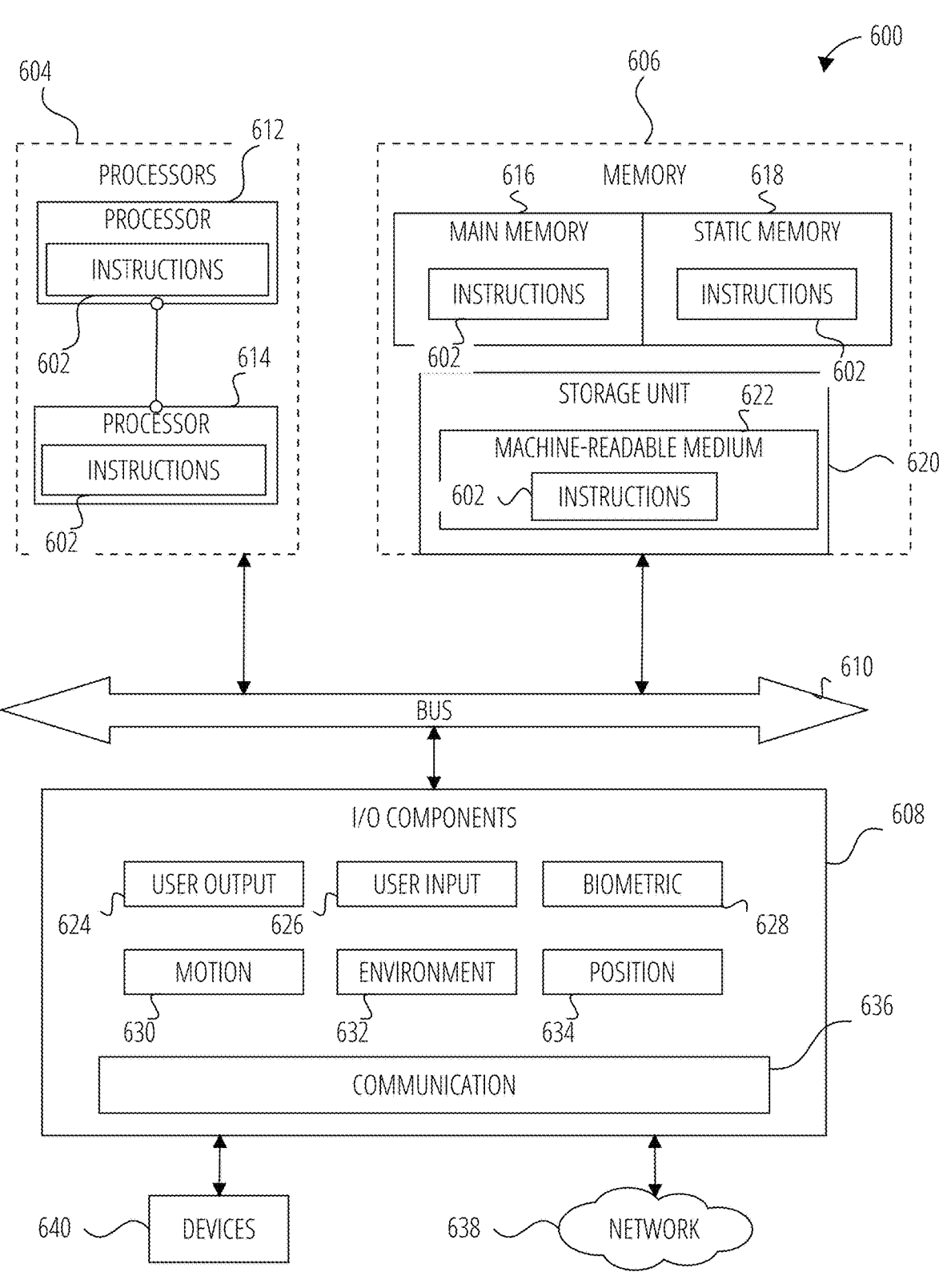
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system 102 or any one of multiple server devices forming part of the interaction server system 110. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network

638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
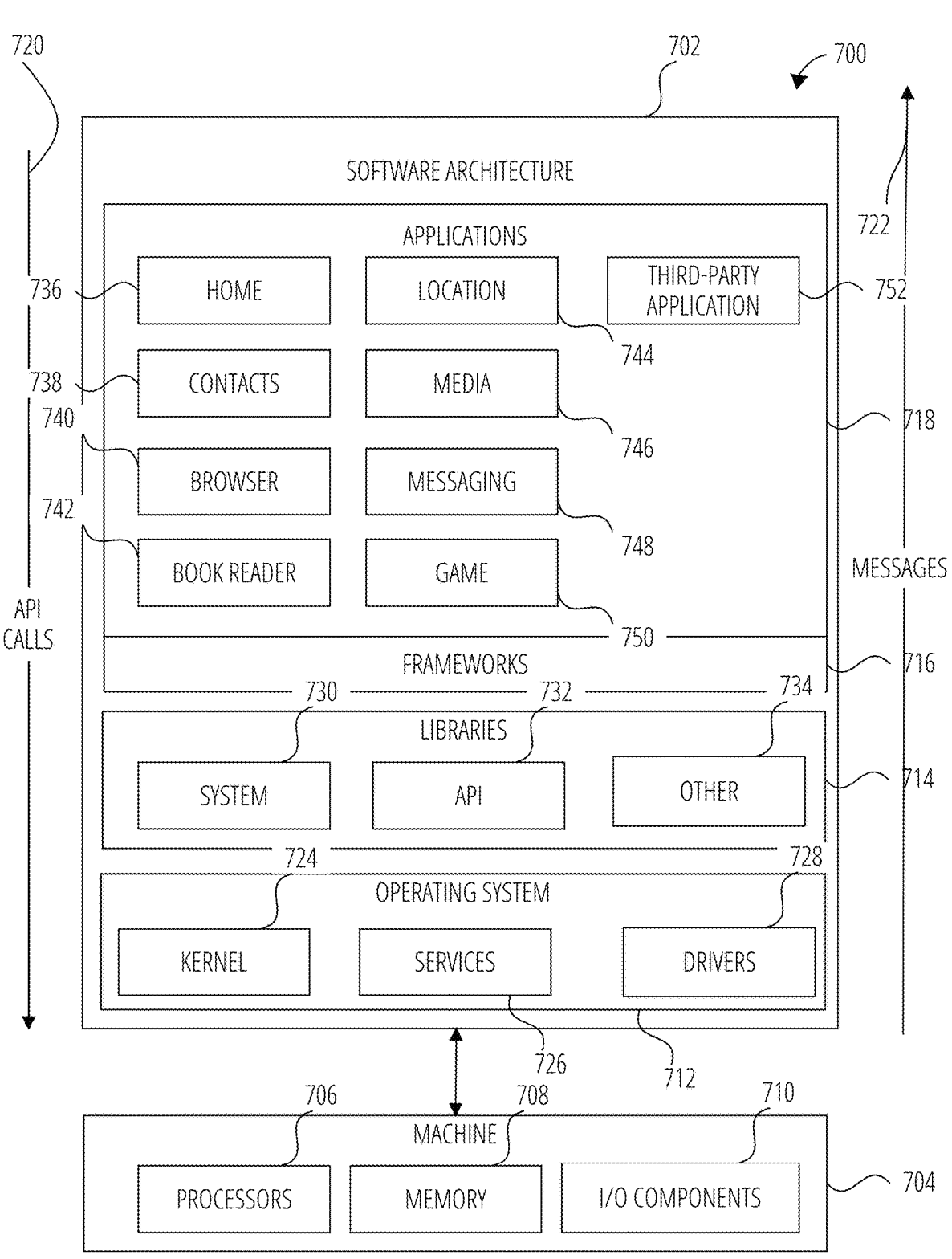
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

Method of Performing Targeted Image Adjustments

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 8 illustrates a process 800 of performing targeted image adjustments in accordance with one example. In one example, the processor in a targeted image adjustment system 234, the processor in the user system 102, the processor in the interaction server system 110 or any combination thereof, can perform the operations in process 800.

In operation 802, the processor receives a media content item. The media content item can be a video or image captured using a camera. For example, a user of the user system 102 captures the video or the image using the camera system 204 and the processor receives the captured video or image as the media content item and performs post-processing on the media content item. In another example, the media content item can be a pre-capture video or image that is displayed in a viewfinder of the user system 102. In this example, the processor receives the pre-capture video or image as the media content item and performs pre-processing on the media content item.

In operation 804, the processor identifies, based on the media content item, an image adjustment parameter and an adjustment value. For example, the processor can analyze the media content item to determine the targeted image adjustments that need to be performed on the media content item. The image adjustment parameters can include, for example, brightness, tone, temperature, contrast, gamma, sharpness, etc. For example, based on an analysis of the media content item received, the processor can identify that the image adjustment parameter to be changed is the temperature level and the adjustment value needed is 10% increase in the temperature level.

In one example, the processor can use a neural network, a machine-learning system, or can execute an algorithm in order to identify the image adjustment parameter and the adjustment value for the media content item received. The neural network or the machine-learning system can be trained using test image adjustment parameters, test adjustment values, and test media content items in order to identify based on the media content item received, an image adjustment parameter and an adjustment value. The test image adjustment parameters, test adjustment values, and test media content items can be a training set that delineates the targeted adjustments needed (e.g., test image adjustment parameters, test adjustment values) to be performed on the test media content items. Similarly, the algorithm can be generated using test image adjustment parameters, test adjustment values, and test media content items in order to identify based on the media content item received, an image adjustment parameter and an adjustment value. In one instance, upon receiving a media content item, using the algorithm, neural network or machine-learning system, the processor can identify a similar test media content item to the media content item and correlate the changes to be made to the media content item with the targeted adjustments needed based on test image adjustment parameters and test adjustment values associated with the test media content item.

In one example, the neural network can be a Long-Short Term Memory (LSTM) Neural Network, a Convolutional Neural Network (CNN), a recurrent neural network (RNN), a Gated Recurrent Unit (GRU) neural network, or any combination thereof. The neural network can, for instance, receive the media content item as input and generate as an output the image adjustment parameter and the adjustment value in association with the media content item.

Additionally, the neural network or the machine-learning system can also be trained using metadata associated with media content items such as images or videos that are publicly shared on the interaction server system 110. The metadata can indicate the pre-capture settings of the camera capturing the media content item, the type of camera used to capture the media content item, the post-processing settings applied in the media content item, the setting selection (e.g., skin tone, skin undertone, etc.) associated with the camera, the background color, the lighting condition, etc. Moreover, the algorithm can also be generated using this metadata.

In operation 806, the processor generates an adjusted media content item using the image adjustment parameter and adjustment value. The targeted image adjustment system can thus automatically improve the media content item by applying the changes to the adjustment parameter that is most likely to be desired by the user (e.g., in order to improve the quality of the media content item). For example, if the media content item is a photo including a human face that is not visible based on the lighting in the photo, the targeted image adjustment system can automatically determine that the shadows are to be removed by decreasing the contrast of the image to generate the adjusted media content item and thereby improving the quality of the photo.

Figures 9, 10:
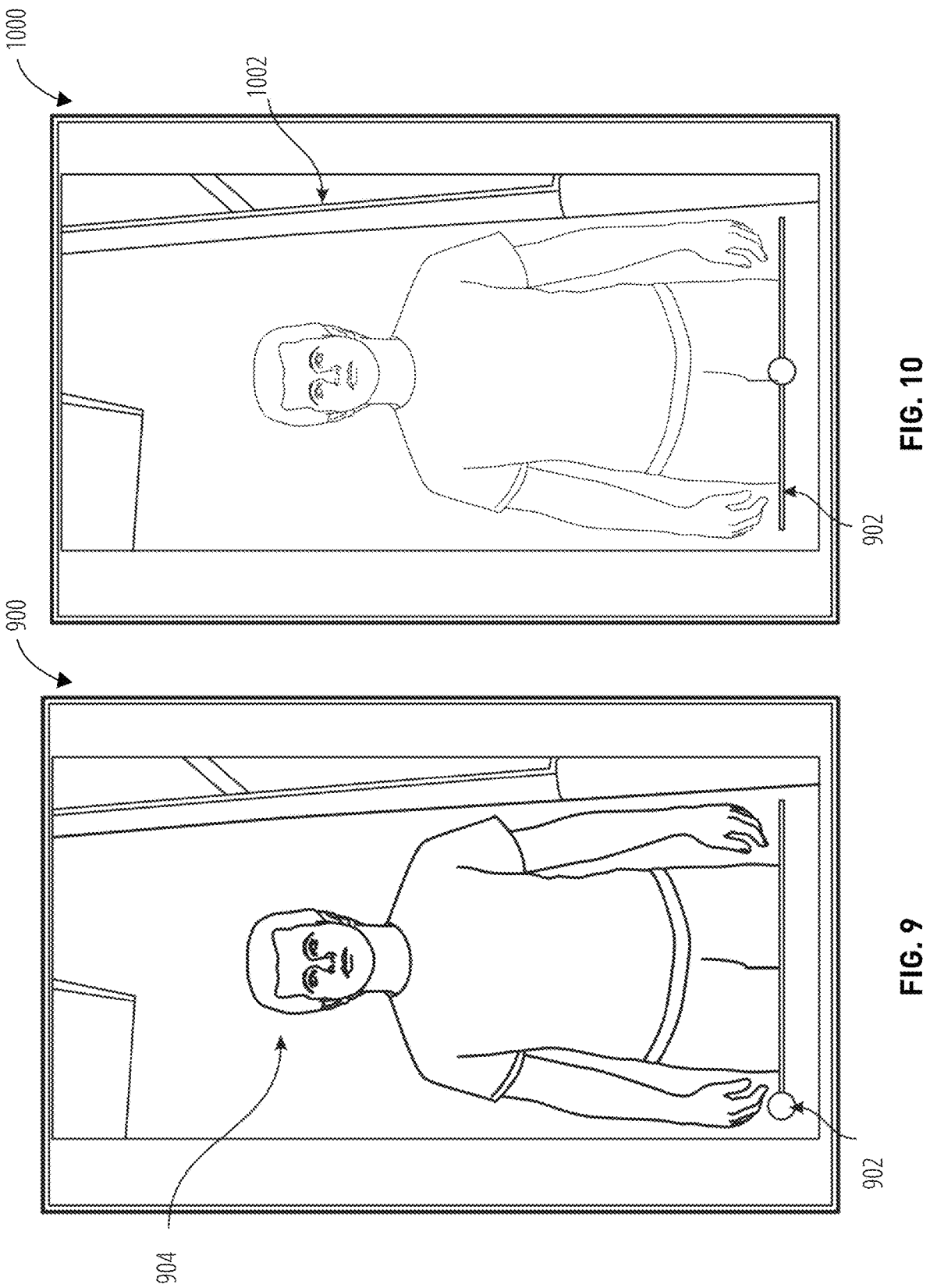
FIG. 9 illustrates an adjustment interface in accordance with one embodiment.
FIG. 10 illustrates an adjustment interface in accordance with one embodiment.

In operation 808, the processor causes an adjustment interface to be displayed by a display of a user device. FIG. 9 and FIG. 10 illustrate an adjustment interface 900 and an adjustment interface 1000 in accordance with some embodiments. As shown in FIG. 9, the adjustment interface 900 includes the adjusted media content item 904 and a selectable item 902. The selectable item 902 is associated with the image adjustment parameter that is identified. The selectable item 902 can include a plurality of settings. For example, the selectable item 902 can be a slider as shown in FIG. 9 which is used by the user to select the desired settings. Based on the position of the slider set by the user, the corresponding adjustment value of that image adjustment parameter is applied to the adjusted media content item to generate the final media content item. While the selectable item 902 is illustrated as a slider, the selectable item 902 can be a plurality of virtual buttons, links, dials or icons including a plurality of settings.

In response to receiving a selection of one of the settings of the selectable item, in operation 810, the processor generates a final media content item based on the selection of the one of the settings, and in operation 812, the processor causes the final media content item to be displayed by the display of the user device. In FIG. 9 and FIG. 10, the selectable item 902 is associated with the image adjustment parameter that is brightness.

As shown in FIG. 10, the adjustment interface 1000 includes the final media content item 1002 and the selectable item 902. After receiving the selection of the user's desired setting of the selectable item 902 (e.g., moving the slider to the middle setting in FIG. 10), the final media content item 1002 is generated using an increased brightness level (e.g., the adjustment value is further increased by 50% in brightness) and caused to be displayed in the adjustment interface 1000.

Accordingly, the selectable item 902 allows the user to fine tune the adjusted media content item 904 with respect to the image adjustment parameter that is identified by the processor (e.g., brightness). The user's fine tuning can further be fed back to the neural network, machine-learning system or algorithm to recalibrate the targeted image adjustment system 234. For example, using the user's fine tuning, the processor can further train the neural network or machine-learning system, or the processor can further adjust the algorithm that it executes to identify the image adjustment parameter and the adjustment value. The user's fine tuning can be the user's selected setting for the image adjustment parameter or the adjustment value associated with the selected setting. Accordingly, the user's fine tuning history (e.g., user's adjustment history) can be further used to aid the processor in the predicting the likely adjustments needed to be automatically made to the generate the adjusted media content item 904 going forward.

In one example, the processor can also identify, based on the media content item, a plurality of image adjustment parameters and a plurality of adjustment values to be applied. For instance, the processor can determine that the media content item presents a white balance issue as well as a tone issue. The processor can determine that adjusting the white balance issue takes precedence over adjusting the tone issue such that the processor identifies the temperature change (to address the white balance issue) to be the image adjustment parameter to be adjusted. In this example, the processor causes a selectable item to be displayed that allows the user to further fine tune the temperature of the adjusted media content item. Alternatively, the processor can generate a selectable item that can adjust a combination of both the temperature and the tone of the adjusted media content item.

While FIG. 9 and FIG. 10 illustrates a single selectable item 902 associated with a single image adjustment parameter, in another example, the processor can also identify, based on the media content item, a plurality of image adjustment parameters and a plurality of adjustment values to be applied. In this example, the processor generates the adjusted media content item based on the plurality of image adjustment parameters and plurality of adjustment values. For instance, the processor can identify brightness and tone as the image adjustment parameters and 10% brighter and 20% tone increase as the adjustment parameters. In this example, the processor can cause an adjustment interface to be displayed that includes the adjusted media content item and a plurality of selectable items 902: a first selectable item to fine tune the brightness of the adjusted media content item and a second selectable item to fine tune the tone of the adjusted media content item. Based on the selections of the settings of each of the selectable items 902 by the user, the processor generates the final media content item. In this example, the user's fine tuning for each of the image adjustment parameters can further be fed back to the neural network, machine-learning system or algorithm to recalibrate the targeted image adjustment system 234.

Conclusion

The targeted image adjustment system 234 improves the functionality of camera systems as well as electronic messaging software and systems by generating targeted adjustments to media content items including images (e.g., photos and videos) captured using the cameras that account for different skin tones in every situation or lighting conditions.

With the targeted image adjustment system that can predict an image adjustment parameter to be applied to a media content item in order to automatically generate an adjusted media content item, the targeted image adjustment system is able to generate the adjusted media content item that already includes likely updates to, for example, the brightness, tone, temperature, contrast, gamma, or sharpness of the image. The targeted image adjustment system thus allows the user to take photos more suited to his/her taste or skin tone without sacrificing the speed and functionalities of the camera system and the interaction server system 110.

The targeted image adjustment system further causes an adjustment interface to be displayed on a user device that includes the adjusted media content item and a selectable item that is associated with the image adjustment parameter (e.g., tone) that allows the user of the user device to further change the adjustment value of this image adjustment parameter to fine tune the adjusted media content item. The targeted image adjustment system can also receive the selections associated the fine tuning performed by the user in order to further improve its algorithm, neural network or machine-learning system such that it can constantly improve its targeted image adjustments.

These improvements ensure that cameras and, in turn, the interaction systems can equitably produce high quality images for every user and thus, improving the camera experience for all users.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" or "user device" or "user system" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data.

The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system comprising:
a processor; and
a memory having instructions stored thereon, when executed by the processor, causes the system to:
receive a media content item;
identify, based on an analysis of the media content item using a neural network or a machine-learning system, an image adjustment parameter and an adjustment value associated with the image adjustment parameter to be applied to the media content item,
wherein the neural network or the machine-learning system is trained using a plurality of test image adjustment parameters and a plurality of test adjustment values, wherein the test image adjustment parameters comprise brightness, tone, temperature, contrast, gamma, and sharpness;
generate an adjusted media content item using the image adjustment parameter and the adjustment value;
cause an adjustment interface to be displayed by a display of a user device, wherein the adjustment interface comprises the adjusted media content item and a selectable item associated with the image adjustment parameter, wherein the selectable item includes a plurality of settings to adjust the adjustment value; and
in response to receiving a selection of one of the settings of the selectable item, generate a final media content item based on the selection of the one of the settings, and
cause the final media content item to be displayed by the display of the user device.

2. The system of claim 1, wherein the media content item is a video or image captured using a camera.

3. The system of claim 1, wherein the media content item is a pre-capture video or image that is displayed in a viewfinder.

4. The system of claim 1, wherein the image adjustment parameter is brightness, tone, temperature, contrast, gamma, or sharpness.

5. The system of claim 4, wherein the neural network or the machine-learning system is trained using a plurality of test media content items.

6. The system of claim 5, wherein the neural network or the machine-learning system is further trained using the selection of the one of the settings.

7. The system of claim 1, wherein the selectable item is a slider or a plurality of selectable buttons or icons.

8. The system of claim 1, wherein the instructions further causing the system to:
identify a plurality of image adjustment parameters and a plurality of adjustment values based on the media content item; and
generate the adjusted media content item using the plurality of image adjustment parameters and the plurality of adjustment values.

9. The system of claim 8, wherein the adjustment interface further comprises a plurality of selectable items associated with the plurality of image adjustment parameters, and wherein the instructions further causing the system to:
generate the final media content item based on a selection of a plurality of settings of the plurality of selectable items associated with the plurality of image adjustment parameters.

10. A method comprising:
receiving, by a processor, a media content item;
identifying, based on an analysis of the media content item using a neural network or a machine-learning system, an image adjustment parameter and an adjustment value associated with the image adjustment parameter to be applied to the media content item,
wherein the neural network or the machine-learning system is trained using a plurality of test image adjustment parameters and a plurality of test adjustment values, wherein the test image adjustment parameters comprise brightness, tone, temperature, contrast, gamma, and sharpness;
generating an adjusted media content item using the image adjustment parameter and adjustment value;
causing an adjustment interface to be displayed by a display of a user device, wherein the adjustment interface comprises the adjusted media content item and a selectable item associated with the image adjustment parameter, wherein the selectable item includes a plurality of settings to adjust the adjustment value; and
in response to receiving a selection of one of the settings of the selectable item,
generating a final media content item based on the selection of the one of the settings, and
causing the final media content item to be displayed by the display of the user device.

11. The method of claim 10, wherein the media content item is a video or image captured using a camera.

12. The method of claim 10, wherein the media content item is a pre-capture video or image that is displayed in a viewfinder.

13. The method of claim 10, wherein the image adjustment parameter is brightness, tone, temperature, contrast, gamma, or sharpness.

14. The method of claim 13, wherein the neural network or the machine-learning system is trained using a plurality of test media content items.

15. The method of claim 14, wherein the neural network or the machine-learning system is further trained using the selection of the one of the settings.

16. The method of claim 10, wherein the selectable item is a slider or a plurality of selectable buttons or icons.

17. The method of claim 10, further comprising:

identifying a plurality of image adjustment parameters and a plurality of image adjustment values based on the media content item; and generating the adjusted media content item using the plurality of image adjustment parameters and the plurality of image adjustment values.

18. The method of claim 17, wherein the adjustment interface further comprises a plurality of selectable items associated with the plurality of image adjustment parameters, and wherein the method further comprising:

generating the final media content item based on a selection of a plurality of settings of a plurality of selectable items.

19. A non-transitory computer-readable storage medium, the computer-readable storage medium including instructions that when executed by a computer, cause the computer to:

receive a media content item;

identify, based on an analysis of the media content item using a neural network or a machine-learning system, an image adjustment parameter and an adjustment value associated with the image adjustment parameter to be applied to the media content item, wherein the neural network or the machine-learning system is trained using a plurality of test image adjustment parameters and a plurality of test adjustment values, wherein the test image adjustment parameters comprise brightness, tone, temperature, contrast, gamma, and sharpness;

generate an adjusted media content item using the image adjustment parameter and the adjustment value;

cause an adjustment interface to be displayed by a display of a user device, wherein the adjustment interface comprises the adjusted media content item and a selectable item associated with the image adjustment parameter, wherein the selectable item includes a plurality of settings to adjust the adjustment value; and in response to receiving a selection of one of the settings of the selectable item, generate a final media content item based on the selection of the one of the settings, and cause the final media content item to be displayed by the display of the user device.

20. The non-transitory computer-readable storage medium of claim 19, wherein the neural network or the machine-learning system is trained using a plurality of test media content items, wherein the image adjustment parameter is brightness, tone, temperature, contrast, gamma, or sharpness.

* * * * *